United States Patent
Espiard et al.

(10) Patent No.: US 8,329,817 B2
(45) Date of Patent: Dec. 11, 2012

(54) MINERAL FIBRE SIZING COMPOSITION CONTAINING A CARBOXYLIC POLYACID AND A POLYAMINE, PREPARATION METHOD THEREOF AND RESULTING PRODUCTS

(75) Inventors: Philippe Espiard, Gouvieux (FR); Marc Dolatkhani, Cestas (FR); Anne Pagnoux, Le Barp (FR); Francois Boyer, Pessac (FR)

(73) Assignee: Saint-Gobain Isover, Courbevoie (FR)

( * ) Notice: Subject to any disclaimer, the term of this patent is extended or adjusted under 35 U.S.C. 154(b) by 0 days.

(21) Appl. No.: 12/819,456

(22) Filed: Jun. 21, 2010

(65) Prior Publication Data
US 2010/0252771 A1    Oct. 7, 2010

Related U.S. Application Data

(63) Continuation of application No. 10/553,467, filed as application No. PCT/FR2004/000941 on Apr. 16, 2004, now abandoned.

(30) Foreign Application Priority Data

Apr. 16, 2003  (FR) ..................... 03 04750

(51) Int. Cl.
| | |
|---|---|
| C08G 69/26 | (2006.01) |
| C08K 3/40 | (2006.01) |
| C08K 5/092 | (2006.01) |
| C08K 5/17 | (2006.01) |
| C08K 9/06 | (2006.01) |
| C08L 77/06 | (2006.01) |
| D02G 3/18 | (2006.01) |
| D02G 3/36 | (2006.01) |
| E04B 1/88 | (2006.01) |
| C03B 5/14 | (2006.01) |

(52) U.S. Cl. ........ 524/606; 524/494; 524/845; 524/879; 525/178; 525/180; 523/206; 428/375; 428/378; 252/62; 65/134.7

(58) Field of Classification Search ............... 524/606, 524/494, 845, 879; 525/178, 180; 523/206; 428/375, 378; 252/62; 65/134.7
See application file for complete search history.

(56) References Cited

U.S. PATENT DOCUMENTS

| | | | |
|---|---|---|---|
| 2,908,584 | A | 10/1959 | Aelony |
| 4,147,833 | A | 4/1979 | Eilerman et al. |
| 4,158,557 | A | 6/1979 | Drummond |
| 4,759,974 | A | 7/1988 | Barthe et al. |
| 5,437,928 | A | 8/1995 | Thimons et al. |
| 5,690,856 | A | 11/1997 | Milleville et al. |
| 6,171,444 | B1 | 1/2001 | Nigam |
| 6,379,794 | B1 * | 4/2002 | Girgis ............ 428/375 |
| 2002/0123560 | A1 | 9/2002 | Audenaert et al. |
| 2002/0162358 | A1 * | 11/2002 | Jeanvoine et al. ......... 65/134.5 |
| 2003/0124932 | A1 * | 7/2003 | Droux ............ 442/164 |

FOREIGN PATENT DOCUMENTS
JP  59-126484  7/1984

* cited by examiner

*Primary Examiner* — Michael Pepitone
(74) *Attorney, Agent, or Firm* — Oblon, Spivak, McClelland, Maier & Neustadt, L.L.P.

(57) ABSTRACT

The invention relates to a sizing composition intended to be applied to mineral fibers, especially glass or rock fibers, which contains at least one polycarboxylic acid and at least one polyamine. It also relates to a method of preparing the composition, to its use for sizing mineral fibers for the purpose of forming, in particular, thermal and/or acoustic insulation products, and to the products obtained.

18 Claims, 1 Drawing Sheet

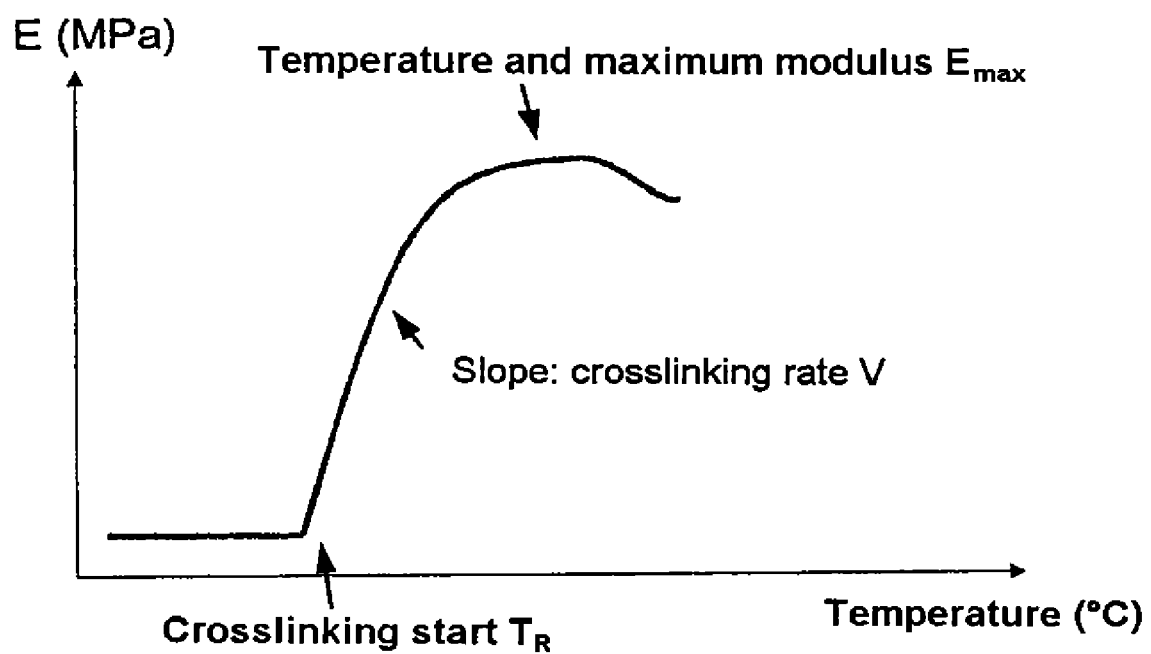

MINERAL FIBRE SIZING COMPOSITION CONTAINING A CARBOXYLIC POLYACID AND A POLYAMINE, PREPARATION METHOD THEREOF AND RESULTING PRODUCTS

CROSS-REFERENCE TO RELATED APPLICATIONS

This application is a continuation of U.S. Ser. No. 10/553,467 filed Nov. 17, 2006, abandoned, which was a 371 of PCT/FR2004/000941 filed Apr. 16, 2004 and claims the benefit of FR 03/04750 filed Apr. 16, 2003.

The present invention relates to the field of sizing compositions for mineral fibers. It relates more particularly to an aqueous size that contains a polycarboxylic acid and a polyamine, to a method for preparing it and to products based on mineral fibers coated with this size.

Most thermal and/or acoustic insulation products containing mineral fibers require the use of a size that binds the fibers together and provides the mechanical integrity suitable for the use for which they are intended. The products must furthermore have sufficient cohesion and strength to withstand the various handling operations before the final installation.

The size is applied to fibers obtained in various ways, depending on the nature of the mineral used (glass, rock, etc.), especially using the known technique of internal or external centrifugal fiberizing. The internal centrifugation consists in introducing the molten material into a spinner having a multitude of small holes, the material being thrown against the peripheral wall of the device in the form of filaments varying in length. At the exit of the device, the filaments are attenuated and entrained by a high-temperature high-velocity gas stream toward a receiving member, in order to form a web of randomly distributed fibers.

To ensure mutual assembly of the fibers, the fibers leaving the spinner are sprayed with the sizing composition containing a thermosetting resin.

The web of fibers coated with the size is then heat-treated at a temperature generally above 100° C. in order to crosslink the resin and thus obtain a cured product having the properties required for forming a thermal and/or acoustic insulation product, especially dimensional stability, tensile strength, thickness recovery after compression and uniform color.

The sizing operation must be carried out under conditions that allow the size to be uniformly distributed over the fibers. In particular, it is necessary to prevent the formation of fiber bundles surrounded by a gangue, these being dispersed within unbonded fibers that are liable to easily break and therefore generate dust. This operation aims to retain fibers that are bonded together by junction points that are sufficiently strong to ensure good cohesion and to ensure that the product does not tear when used. However, the cohesion must not be too high, so that the bonding remains flexible and the final product retains a certain deformability. In particular, the junctions between the fibers must provide a network that is stable and rigid enough to withstand the compression imposed by storing and transporting the product, and must meet the supplier's specifications when the product is being made.

Under the conditions of the method, the size is, as indicated above, sprayed onto the fibers as they are being formed. Consequently, the size must have a low viscosity in the uncrosslinked state and rapidly tend toward a more viscous state before giving a polymeric network through the action of heat. If the viscosity in the uncrosslinked state is too high, the size has a tendency to be tacky and runs the risk of forming deposits on the receiving members during the heat treatment of the fibrous web.

Many known thermally crosslinkable polymers are capable of meeting the abovementioned conditions. However, as regards insulation, most of the market is represented by standard consumer products for which price is a key factor. For these reasons, thermally crosslinkable polymers, such as expensive polyurethanes and epoxies, are not currently used for industrial exploitation even though they prove to be technically acceptable.

The thermosetting polymers used most often in sizes are in the form of phenoplast-type resins (phenol-formaldehyde resins) or aminoplast-type resins (melamine-formaldehyde or urea-formaldehyde resins). In the size, the resin is generally combined with water as dilution agent, with urea that serves to reduce the amount of free formaldehyde and also acts as binder, and with various additives, such as oil, aqueous ammonia, dyes or pigments and, optionally, fillers.

The sizes containing such resins are not entirely satisfactory as they are liable to generate undesirable gases, especially formaldehyde, methyl isocyanate (MIC) and/or isocyanic acid (ICA) when they are heated to more than 150° C., during the crosslinking step to form the product, or even up to 700° C. in certain cases, such as domestic ovens.

Various solutions have been proposed for reducing the undesirable emissions.

A first means consists in using mineral sizes, for example containing aluminum phosphate. However, although these sizes prove to be satisfactory for temperatures up to 500° C., or even 700° C., they have other drawbacks: they are moisture-sensitive and have a tendency to swell during storage and to delaminate, which increases the risk of portions of the product being torn off when it is being handled.

Another means of limiting undesirable emissions is based upon the use of sizes based on organic resins other than phenol-formaldehyde resins.

In particular, it has been proposed to form products based on mineral fibers by means of a size comprising a polycarboxylic acid and a polyol, preferably combined with a catalyst of the type consisting of a salt of an alkali metal and an organophosphorus acid (see EP-A-0 990 727, EPA-A-0 990 728 and EP-A-0 990 729). The polycarboxylic acid is an oligomer or a polymer preferably having a mass of less than 10 000 and containing more than one carboxylic group and the polyol contains at least two hydroxyl groups. The examples use a poly(acrylic acid) and triethanolamine.

WO-A-93/36368 discloses mineral fibers crosslinked by means of a size comprising one or more compounds containing a carboxylic functional group and/or a β-hydroxyalkylamide functional group. The illustrative examples result from the reaction between a carboxylic acid anhydride and diethanolamine or triethanolamine.

EP-A-1 164 163 discloses a method of manufacturing glass wool that comprises a step consisting in reacting a size containing either a carboxylic acid and an alkanolamine, or a resin synthesized beforehand from a carboxylic acid and an alkanolamine, with a polymer containing a carboxylic group.

In EP-A-1 170 265, it is proposed to prepare sizes in two steps, consisting in mixing an anhydride with an amine under reactive conditions, until the anhydride has substantially dissolved in the amine and/or reacted with it, and then in adding water to terminate the reaction.

Finally, EP-A-1 086 932 proposes a size for mineral wool, which contains a resin comprising the non-polymeric reaction product resulting from the reaction of an amine with a first anhydride and a second anhydride different from the first.

Although satisfactory with regard to the emission of undesirable gases, the aforementioned sizes nevertheless remain less effective than those containing conventional phenol-formaldehyde resins. Although the sizes based on polyacrylics and β-hydroxyalkylamide lead to good mechanical properties before ageing, these are substantially degraded when the product is exposed to a temperature above 40° C. in a highly humid atmosphere.

In addition, the crosslinking of polyacrylic-based sizes starts in general at a temperature of around 180° C. and it reaches the final stage only if the duration of the treatment at this temperature is extended or the temperature is raised to about 240° C. Compared with sizes based on phenol-formaldehyde resin, these conditions are more restrictive and more expensive as they mean that the length of the ovens have to be increased and/or more powerful heating means have to be used. Polyacrylics also have a tendency to stiffen the fibers in the web before crosslinking, with the consequence that it is more difficult for the fibers to come close together and the number of bonding points is fewer.

It should also be noted that polyester-based sizes are more difficult to employ because they form tacky deposits on the devices for conveying the web.

There is a need for sizing compositions which have a low level of emission of undesirable gases, so as best to meet the environmental requirements, and which maintain the intrinsic characteristics of sizing compositions, especially those that are capable of crosslinking under standard conditions.

The present invention aims to alleviate the aforementioned drawbacks by providing a novel sizing composition that can coat mineral fibers, in particular to form thermal and/or acoustic insulation products.

BRIEF DESCRIPTION OF THE DRAWING

FIG. 1 shows the curve of the variation in elastic modulus E (in MPa) as a function of temperature (in ° C.).

The object of the invention is also to provide a method of preparing said composition that makes it possible to obtain an advantageous—more effective or less expensive—size.

The subject of the invention is also the use of said composition for bonding mineral fibers with a view to forming thermal and/or acoustic insulation products, and the products thus obtained.

The sizing composition according to the invention, intended to be applied to mineral fibers, is characterized in that it contains at least one polycarboxylic acid and at least one polyamine.

The polycarboxylic acid according to the invention has a functionality, expressed by the number of carboxylic groups that can react with the polyamine, equal to or greater than 2, preferably less than 5000, advantageously less than 2000 or even less than 500.

Preferably, the molecular mass of, the polycarboxylic acid ranges from 50 to $10^5$ g/mol and preferably is less than $10^4$ g/mol. By keeping the molecular mass within the limits indicated, it is possible for the stiffness of the final crosslinked product not to be excessively high.

As examples of polycarboxylic acids of low molecular mass, mentioned may be made of carboxylic acids of functionality equal to 2, such as succinic acid, glutaric acid, adipic acid, azelaic acid, sebacic acid, tartaric acid, phthalic acid and tetrahydrophthalic acid, carboxylic acids of functionality equal to 3, such as citric and trimellitic acid, and carboxylic acids of functionality equal to 4, such as 1,2,3,4-butanetetra-carboxylic acid (BTCA).

The polycarboxylic acids of higher molecular mass may especially be chosen from oligomers and polymers that are obtained by homopolymerization of unsaturated acids, such as acrylic acid, methacrylic acid, crotonic acid, isocrotonic acid, maleic acid, cinnamic acid, 2-methylmaleic acid, itaconic acid, 2-methylitaconic acid and α,β-methyleneglutaric acid. The polycarboxylic acid may also be obtained by copolymerization of one or more of the aforementioned monomers with one or more other, hydrophilic and/or hydrophobic, unsaturated monomers for example selected from olefins, such as ethylene, propylene, butylene, isobutylene and styrene and its derivates, and macromonomers (oligomers containing one or more reactive unsaturated functional groups) having terminal unsaturation.

The aforementioned polycarboxylic acids, that are in the form of monomer, oligomer or polymer, may be obtained in a known manner from the aforementioned acids or from the corresponding anhydrides when they exist. As examples, mention may be made of succinic anhydride, glutaric anhydride, phthalic anhydride, tetrahydrophthalic anhydride, trimellitic anhydride, maleic anhydride and methacrylic anhydride.

Preferably, the polycarboxylic acid is chosen from citric or tartaric acid, 1,2,3,4-butanetetracarboxylic acid (BTCA), polyacrylics such as poly(acrylic acid), ethylene/acrylic acid copolymers and acrylic acid/maleic acid copolymers. It is more particularly preferable to choose tartaric acid, BTCA, polyacrylic acids and acrylic acid/maleic acid copolymers.

The polyamine according to the invention has a functionality, expressed by the number of amine functional groups, which is equal to or greater than 2, preferably less than 200. Advantageously, these functional groups are primary and/or secondary amine functional groups.

The polyamine may be chosen from a wide range of polyamines, for example aliphatic polyamines having a saturated or unsaturated, linear, branched or cyclic chain, possibly containing one or more heteroatoms, especially N and/or O, and aromatic polyamines. As examples, mention may be made of 1,3-bis(aminomethyl)cyclohexane and m-xylene-α, α'-diamine.

Preferably, the polyamine has a molecular mass of less than 1000 g/mol and better still less than 500 g/mol.

Polyamines satisfying the following general formula prove to be particularly beneficial:

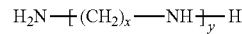

in which:
x varies from 2 to 10, preferably 2 to 4 and
y varies from 1 to 10.

Advantageously, diethylenetriamine (DETA), triethylenetetramine (TETA) and tetraethylenepentamine (TEPA) are used.

Among polyamines of higher molecular mass, mention may be made of polyethyleneimines, polyaminostyrenes, and products resulting from the degradation of chitin in basic medium (chitosans).

Certain polyamines may prove to be very sparingly soluble in water. To avoid having to use the polyamine in the form of a highly dilute solution and therefore of having to handle and store large quantities of water, it is advantageous to convert it, at least partly, into a more soluble salt. To do this, the polyamine is dissolved in water containing an organic or mineral acid, for example sulfamic acid or hydrochloric acid.

The amount of acid to be used depends on the solubility of the polyamine and on the nature of the salt to be formed. In general, it is necessary to obtain a solution containing 1 to 10 molar equivalents, preferably around one molar equivalent, of amide salt and 1 to 10 molar equivalents, preferably around 5 molar equivalents, of polyamine.

The aqueous polyamine solutions useful within the context of the invention possess a solids content by weight that varies between 10 and 50% and is preferably around 25%, in particular 18%.

The sizing composition is generally obtained by diluting or emulsifying, in water, the polycarboxylic acid and the polyamine, optionally with the additives defined later.

According to a first method of implementation, the size is formed by mixing the polycarboxylic acid in solution or in aqueous dispersion, preferably containing at most 10% by weight, with the polyamine in aqueous solution, preferably containing at most 10% by weight, optionally with the additives.

According to a second method of implementation, a premix is made by introducing the polyamine directly into the aqueous solution or dispersion of polycarboxylic acid, preferably containing at most 10% by weight, and then the optional additives are added subsequently.

This method of implementation prevents the polycarboxylic acid from reacting with the polyamine and forming products that precipitate and make the size unusable.

The premixing is generally carried out in a device equipped with a cooling system for controlling the temperature of the mixture at about 75° C., preferably around 70° C. so as to avoid any uncontrolled reaction between the polycarboxylic acid and the polyamine (a highly exothermic reaction). The premix is stable and may in particular be stored at 20° C. for several days before being used in the size.

It may prove to be advantageous to subject the premix to a heat treatment for the purpose of reacting, at least partly, the polyacid with the polyamine. This procedure makes it possible to shorten the residence time and/or to lower the temperature in the oven and consequently to reduce the cost of the final product. The heat treatment is carried out at a moderate temperature, of around 50 to 100° C., so as to be able to control the extent of the reaction, especially to avoid a large increase in the viscosity, preventing suitable application of the binder to the fibers.

The sizing composition thus formed generally comprises, expressed in parts of dry matter, from 20 to 80 parts by weight of polycarboxylic acid and from 80 to 20 parts by weight of polyamine.

In general, the sizing composition furthermore includes the following additives, per 100 parts by weight of dry matter of polycarboxylic acid and of polyamine:
  from 0 to 20 parts, preferably 6 to 15 parts, of an oil;
  0 to 2 parts, preferably 0.4 parts, of a silane;
  0 to 5 parts of a catalyst; and
  0 to 20 parts of a plasticizer.

The well-known role of the aforementioned additives will be briefly recalled here:
  the water acts as a lubricant and makes it possible to adjust the viscosity to the spraying conditions, to cool the fibers and to limit pregelling effects;
  the oil lubricates the fibers, makes it possible to reduce the amount of dust liable to be generated when handling the finished products (for example insulating sheets) and improves the feel. It is generally inert with respect to the other constituents and can be emulsified in water. Usually, it is an oil consisting of hydrocarbons extracted from petroleum;
  the silane provides coupling between the mineral fiber and the polycarboxylic acid/polyamine crosslinking product. It enhances the mechanical properties and improves the ageing resistance. The silane is generally an aminosilane, preferably γ-aminopropyltriethoxysilane;
  the catalyst is used to accelerate the rate of reaction of the polycarboxylic acid with the polyamine, and therefore to reduce the residence time of the web in the oven. As an example, mention may be made of LiCl, LiOCOCH$_3$, CaCl$_2$, MgCl$_2$, ZnCl$_2$, ZnO and P(OCH$_3$)$_3$; and
  the plasticizer is used to limit pregelling effects and to moderate the stiffness of the final product. As an example, mention may be made of alcohols, preferably polyols such as glycerol, and triethanolamine.

The mineral fibers treated with the sizing composition according to the invention are sheeted out and bonded together through the action of heat, at a temperature that varies from 150 to 250° C., preferably 180 to 220° C. In its crosslinked form, the binder is solid, infusible and insoluble in water and it represents about 1 to 15% of the total weight of the fibers. The products obtained may have a variable appearance, for example a web or a veil of fibers.

The veil of mineral fibers, especially glass fibers, generally has a grammage between 10 and 300 m$^2$/g and preferably contains at least 1%, or 2% or even more than 4% by weight of size. Although it can be used by itself, the veil is particularly intended for coating at least one external face of an insulating web as described above.

The products obtained within the context of the present invention are especially intended to form thermal and acoustic insulation products, in particular for buildings and domestic ovens. They may also be used as substrates for soilless cultivation.

The following nonlimiting examples illustrate the invention.

In these examples:
  the reactivity of the size and the properties of the binder, after crosslinking, are measured using the method called DMA (Dynamic Mechanical Analysis), which allows the viscoelastic behavior of a polymeric material to be characterized.

The procedure is as follows: a specimen of Whatmann paper impregnated with the sizing solution is clamped horizontally between two fixed jaws and an oscillating element applied against the upper face of the specimen, this element being provided with a device for measuring the stress as a function of the strain applied, is used to calculate the elastic modulus E. The specimen is heated to a temperature ranging from 20 to 300° C. at a rate of 5° C./min. From the measurements, the curve of the variation in elastic modulus E (in MPa) as a function of temperature (in ° C.) is plotted, the overall appearance of which is given in FIG. 1. From the curve, the pregelling start temperature ($T_{PG}$), the crosslinking start temperature ($T_R$), the slope corresponding to the crosslinking rate V (in MPa/min), the maximum change in elastic modulus $\Delta E_{max}$ (in MPa) and the elastic modulus for a temperature of 220° C. ($E_{220}$) are determined. The area under the curve is also calculated for temperatures between $T_R$ and 220° C. using the following formula:

$$A = (E_{220} - E_{TR}) \times V$$

in which $E_{220}$ and V have the meaning given above and $E_{TR}$ represents the modulus E at the temperature $T_R$. Table 1 gives the ratio of the area A for each example to the area ($A_{ref}$) of example 8 chosen as reference; and the emission of formaldehyde is measured by placing about 3 to 4 g of the sizing solution to be tested (having a solids content of about 30%) in an oven at 180° C. for one hour in a stream of air (1 l/min). The vapors that are discharged from the oven are sent into two spargers containing water that are connected in series. The trapped formaldehyde is quantitatively determined by spectrocolorimetry and its content is given in mg/g of crosslinked binder.

EXAMPLE 1

5 g of sulfamic acid were introduced into a two-necked flask containing 15.53 g of water, heated to 90° C. and fitted on top with a bubble condenser. When the acid was completely dissolved, the temperature was taken to 60° C. for 15 minutes and then 7.66 ml of triethylenetetramine (TETA) were added. After 15 minutes, the mixture was left to cool and a further 38.32 ml of TETA were added. The solution obtained contained 1 equivalent of salified TETA and 5 equivalents of TETA. The solids content was 76.4%.

5 g of a 20 wt % solution of 1,2,3,4-butanetetracarboxylic acid (BTCA) in water and 0.37 ml of the aforementioned TETA solution were poured into a container. The mixture was stirred for about 15 minutes.

A clear solution containing 23.9% by weight of solids was obtained. The polycarboxylic acid/polyamine weight ratio was 81/19.

The measurements relating to the reactivity of the solution obtained and to the mechanical properties of the binder are given in Table 1.

EXAMPLE 2

5 g of sulfamic acid were introduced into a two-necked flask containing 15.53 g of water, heated to 90° C. and fitted on top with a bubble condenser. When the acid was completely dissolved, the temperature was taken to 60° C. for 15 minutes and then 9.79 ml of tetraethylenepentamine (TEPA) were added. After 15 minutes, the mixture was left to cool and a further 48.96 ml of TEPA were added. The solution obtained contained 1 equivalent of salified TEPA and 5 equivalents of TETA. The solids content was 80.3%.

5 g of a 20 wt % solution of 1,2,3,4-butanetetracarboxylic acid (BTCA) in water and 1.46 ml of the aforementioned TEPA solution were poured into a container. The mixture was stirred for about 15 minutes.

A clear solution containing 25% by weight of solids was obtained. The polycarboxylic acid/polyamine weight ratio was 44/56.

The measurements relating to the reactivity of the solution obtained and to the mechanical properties of the binder are given in Table 1.

EXAMPLE 3

8 g of a 30 wt % solution of tartaric acid in water and 2 g of a 30 wt % solution of tetraethylenepentamine (TEPA) in water were poured into a container. The mixture was stirred for about 15 minutes.

A clear solution, yellow to pale orange in color, with a 30 wt % solids content was obtained. The polycarboxylic acid/polyamine weight ratio was 80/20.

The measurements relating to the reactivity of the solution obtained and to the mechanical properties of the binder are given in Table 1.

EXAMPLE 4

5.5 g of a 30 wt % solution of polyacrylic acid (1500 g/mol molecular weight) in water and 4.5 g of a 30 wt % solution of tetraethylenepentamine (TEPA) in water were poured into a container. The mixture was stirred for about 15 minutes.

A clear solution with a 30 wt % solids content was obtained. The polycarboxylic acid/polyamine weight ratio was 55/45.

The measurements relating to the reactivity of the solution obtained and to the mechanical properties of the binder are given in Table 1.

EXAMPLE 5

3.9 g of a 30 wt % solution of a polyacrylic acid resin (ACUSOL 440®, sold by Rohm and Haas; 3700 g/mol molecular weight) in water and 6.1 g of a 30 wt % solution of tetraethylenepentamine (TEPA) in water were poured into a container. The mixture was stirred for about 15 minutes.

A clear solution with a 30 wt % solids content was obtained. The polycarboxylic acid/polyamine weight ratio was 39/61.

The measurements relating to the reactivity of the solution obtained and to the mechanical properties of the binder are given in Table 1.

EXAMPLE 6

Various sizing compositions having variable contents of acrylic acid/maleic acid copolymer (SOKOLAN® 12S from BASF) and of tetraethylenepentamine (TEPA) as indicated in Table 1 were prepared. When required, the sizing composition contained 5 to 10 parts of glycerol per 100 parts of solid matter (calculated on the basis of the copolymer and of the TEPA). The measurements relating to the reactivity of the various sizes and to the mechanical properties of the binders are given in Table 1.

EXAMPLE 7 (COMPARATIVE EXAMPLE)

A sizing solution comprising 10 wt % of a conventional phenolic resin obtained according to example 1 of EP-A-0 148 050 was used. The resin was obtained as a condensate of phenol and formaldehyde in a formaldehyde/phenol molar ratio of 3.5 in the presence of NaOH, by adding urea during the cooling phase and by neutralizing the resin with sulfuric acid.

The measurements relating to the reactivity of the size obtained and to the mechanical properties of the binder are given in Table 1.

EXAMPLE 8 (COMPARATIVE EXAMPLE)

A solution of a polyester resin obtained by reaction of polyacrylic acid (approximately 60 000 molecular weight) and triethanolamine (HF05, sold by Rohm and Haas) was used.

The measurements relating to the reactivity of the solution and to the mechanical properties of the binder are given in Table 1.

TABLE 1

| Ex. | Polyacid | Poly-amine | Wt % (dry weight) | Glycerol | pH | PRE-GELLING $T_{PG}$ (°C.) | PRE-GELLING $\Delta E_{max}$ (MPa) | CROSSLINKING $T_R$ (°C.) | CROSSLINKING V (MPa/°C.) | CROSSLINKING $E_{220}$ (MPa) | $A/A_{ref}$ | Formaldehyde |
|---|---|---|---|---|---|---|---|---|---|---|---|---|
| 1 | BTCA | TETA | 81/19 | 0 | 5 | 80 | 1100 | 168 | 31 | 1100 | 1.8 | — |
| 2 | BTCA | TEPA | 44/56 | 0 | — | 80 | 1800 | 170 | 24 | 1800 | 1.4 | — |
| 3 | Tartaric acid | TEPA | 80/20 | 0 | — | 90 | 186 | 195 | 130 | 3500 | 3.7 | — |
| 4 | Polyacrylic acid | TEPA | 55/45 | 0 | — | 80 | 500 | 190 | 186 | 4000 | 6.4 | — |
| 5 | Polyacrylic acid | TEPA | 39/61 | 0 | 10.8 | 90 | 500 | 203 | 80 | 3000 | 1.6 | — |
| 6 | Acrylic acid/maleic acid copolymer | TEPA | 36/64 | 0 | 10.0 | 100 | 200 | 176 | 41 | 2500 | 2 | — |
|  |  |  |  | 5 | 10.1 | P | <100 | 171 | 49 | 2300 | 2.7 | — |
|  |  |  |  | 10 | 10.2 | N | — | 171 | 49 | 2200 | 2.7 | — |
|  |  |  | 38/62 | 0 | 10.1 | 100 | 200 | 174 | 58 | 2000 | 3.0 | — |
|  |  |  | 40/60 | 0 | 9.8 | 90 | 500 | 170 | 67 | 2000 | 3.8 | 0.06 |
|  |  |  |  | 5 | 9.9 | P | 200 | 178 | 124 | 4000 | 6.0 | — |
|  |  |  | 46/54 | 0 | — | 90 | 900 | 181 | 112 | 4000 | 5.0 | 0.04 |
|  |  |  |  | 10 | 9.2 | 90 | 150 | 186 | 131 | 2000 | 5.1 | — |
| 7 | — | — | — | — | — | — | 75 | 100 | 157 | 80 | 5.8 | 0.5 |
| 8 | Polyacrylic acid | — | — | — | 3.9 | 100 | 570 | 195 | 35 | 1600 | 1 | 0.05 |

P: progressive
N: none

The results obtained with the sizing compositions according to the invention are readily distinguishable from the known sizes based on phenolic resin (example 7) and polyester resin (example 8)

Specifically, the sizes according example 6 emit a substantially smaller amount of formaldehyde (about 10 times less) than the conventional phenolic resin of example 7, and of the same order of magnitude as the polyester resin of example 8.

The sizes according to the invention have a crosslinking start temperature $T_R$ that is above the phenolic size of example 7 and, in the case of most of them, also below the polyester size of example 8.

The $A/A_{ref}$ ratio, always greater than 1, shows that, compared with the polyester reference resin, the sizes of the invention behave better in terms of crosslinking. The sizes of examples 3 to 5, which have a temperature $T_R$ of the same order or higher than that of the reference size have, however, a higher crosslinking rate, this being advantageous as it makes it possible to reduce the residence time of the fibers in the crosslinking oven. For the sizes whose crosslinking starts at a lower temperature, these have a higher final modulus $E_{220}$ and therefore have better mechanical properties without an increase in cost.

The sizes according to examples 4 and 6 are particularly advantageous as they rapidly reach $E_{220}$ modulus values equal to more than twice those of the known sizes.

The addition of glycerol to the size makes it possible to adjust the processing conditions, in particular by reduction or even prevention of pregelling effects.

The invention claimed is:

1. A thermal and/or acoustic insulation product, comprising mineral fibers and a thermally crosslinkable sizing composition consisting of at least one polycarboxylic acid, at least one polyamine, and
   from 0 to 20 parts of an oil,
   0 to 2 parts of a silane,
   0 to 5 parts of a catalyst,
   optionally water; and
   0 to 20 parts of a plasticizer,
   wherein the amounts are expressed in parts by weight per 100 parts by weight of dry matter of the at least one polycarboxylic acid and at least one polyamine,
   wherein the insulation product is manufactured by internal or external centrifugal fiberizing.

2. The product as claimed in claim 1, wherein the polycarboxylic acid has a functionality, expressed by the number of carboxylic groups that can react with the polyamine, equal to or greater than 2.

3. The product as claimed in claim 1, wherein the polycarboxylic acid has a molecular mass ranging from 50 to 105 g/mol.

4. The product as claimed in claim 1, wherein the polycarboxylic acid is a carboxylic acid with a functionality equal to 2, a carboxylic acid with a functionality equal to 3, or a carboxylic acid with a functionality equal to 4.

5. The product as claimed in claim 4, wherein the carboxylic acid is citric acid, tartaric acid or 1,2,3,4-butanetetracarboxylic acid (BTCA).

6. The product as claimed in claim 2, wherein the polycarboxylic acid is chosen from oligomers and polymers that are obtained by homopolymerization of unsaturated acids, or by copolymerization of one or more of these monomers with one or more other, hydrophilic and/or hydrophobic, unsaturated monomers selected from olefins, and macromonomers having terminal unsaturation.

7. The product as claimed in claim 6, wherein the polycarboxylic acid is a polyacrylic copolymer.

8. The product as claimed in claim 1, wherein the polyamine has a functionality, expressed by the number of amine functional groups, equal to or greater than 2.

9. The product as claimed in claim 1, wherein the amine functional groups are primary and/or secondary amine functional groups.

10. The product as claimed in claim 1, wherein the polyamine is chosen from aliphatic polyamines having a saturated or unsaturated, linear or branched chain, possibly containing one or more heteroatoms, and aromatic polyamines.

11. The product as claimed in claim 1, wherein the polyamine has a molecular mass of less than 1000 g/mol.

12. The product as claimed in claim 1, wherein the polyamine is chosen from:
compounds of formula:

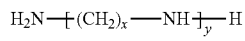

in which:
x varies from 2 to 10 and
y varies from 1 to 10;
polyethyleneimines, polyaminostyrenes, and products resulting from the degradation of chitin in basic medium (chitosans).

13. The product as claimed in claim 1 wherein the polycarboxylic acid is present in an amount of 20 to 80 parts by weight of the dry matter of the sizing composition and wherein the polyamine is present in an amount of 80 to 20 parts by weight of the dry matter of the sizing composition.

14. The product of claim 1, wherein the mineral fibers are glass fibers or rock fibers.

15. The product of claim 1, which is a veil of mineral fibers with a grammage of between 10 and 300 g/m2.

16. A method of manufacturing the insulation product of claim 1, comprising preparing a thermally crosslinkable sizing composition by diluting or emulsifying, in water, the at least one polycarboxylic acid and the at least one polyamine; optionally adding at least one of the oil, the silane, the catalyst, and the plasticizer to the sizing composition after the polycarboxylic acid is added; applying the sizing composition to the mineral fibers, and heating the sized mineral fibers to cure the sizing composition.

17. The method as claimed in claim 16, wherein the polycarboxylic acid is present in an amount of at least 10% by weight of a solution resulting from the diluting or emulsifying and the polyamine is present in an amount of at least 10% by weight of a solution resulting from the diluting or emulsifying.

18. The method as claimed in claim 16, wherein the thermally crosslinkable sizing composition is heated to a temperature of about 50 to 100° C. before being applied to the mineral fibers.

\* \* \* \* \*